(12) United States Patent
Hoffmann et al.

(10) Patent No.: US 6,227,180 B1
(45) Date of Patent: May 8, 2001

(54) CONTROL OF SUPERCHARGED INTERNAL COMBUSTION ENGINE

(75) Inventors: Hanns Hoffmann, Stuttgart; Wolfgang Widmann, Erdmannhausen, both of (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/379,371

(22) Filed: Aug. 23, 1999

(30) Foreign Application Priority Data

Sep. 10, 1998 (DE) .............................................. 198 41 330

(51) Int. Cl.⁷ ...................................................... F02B 33/00
(52) U.S. Cl. ............................... 123/564; 60/295; 60/280; 60/307; 60/278
(58) Field of Search ............................... 123/564; 60/295, 60/280, 307, 278

(56) References Cited

U.S. PATENT DOCUMENTS

| | | | |
|---|---|---|---|
| 3,602,204 | * 8/1971 | Grosseau | 123/52 M |
| 5,458,855 | * 10/1995 | Gillbrand | 123/564 |
| 5,803,027 | * 9/1998 | Bell et al. | 123/564 |
| 5,937,831 | * 8/1999 | Volkmann et al. | 123/564 |
| 5,974,792 | * 11/1999 | Isobe | 60/278 |

FOREIGN PATENT DOCUMENTS 44 41 164    5/1996  (DE) .

* cited by examiner

*Primary Examiner*—Thomas Denion
*Assistant Examiner*—Thai-Ba Trieu
(74) *Attorney, Agent, or Firm*—Klaus J. Bach

(57) ABSTRACT

In an arrangement and method for controlling a supercharged internal combustion engine having a charger arranged in the air intake duct and a catalytic converter arranged in the exhaust duct, with a secondary air duct including a control valve extending from a point of the intake duct downstream of the charger and upstream of a first throttle member to a point of the exhaust duct upstream of the catalytic converter, a second throttle member is arranged in the intake duct upstream of the charger and the throttle members and control valve are controlled by a control unit in such a way that sufficient air is supplied to the exhaust duct upstream of the catalytic converter such that, during engine warm-up, combustion takes place in the catalytic converter causing rapid heat-up of the catalytic converter.

4 Claims, 1 Drawing Sheet

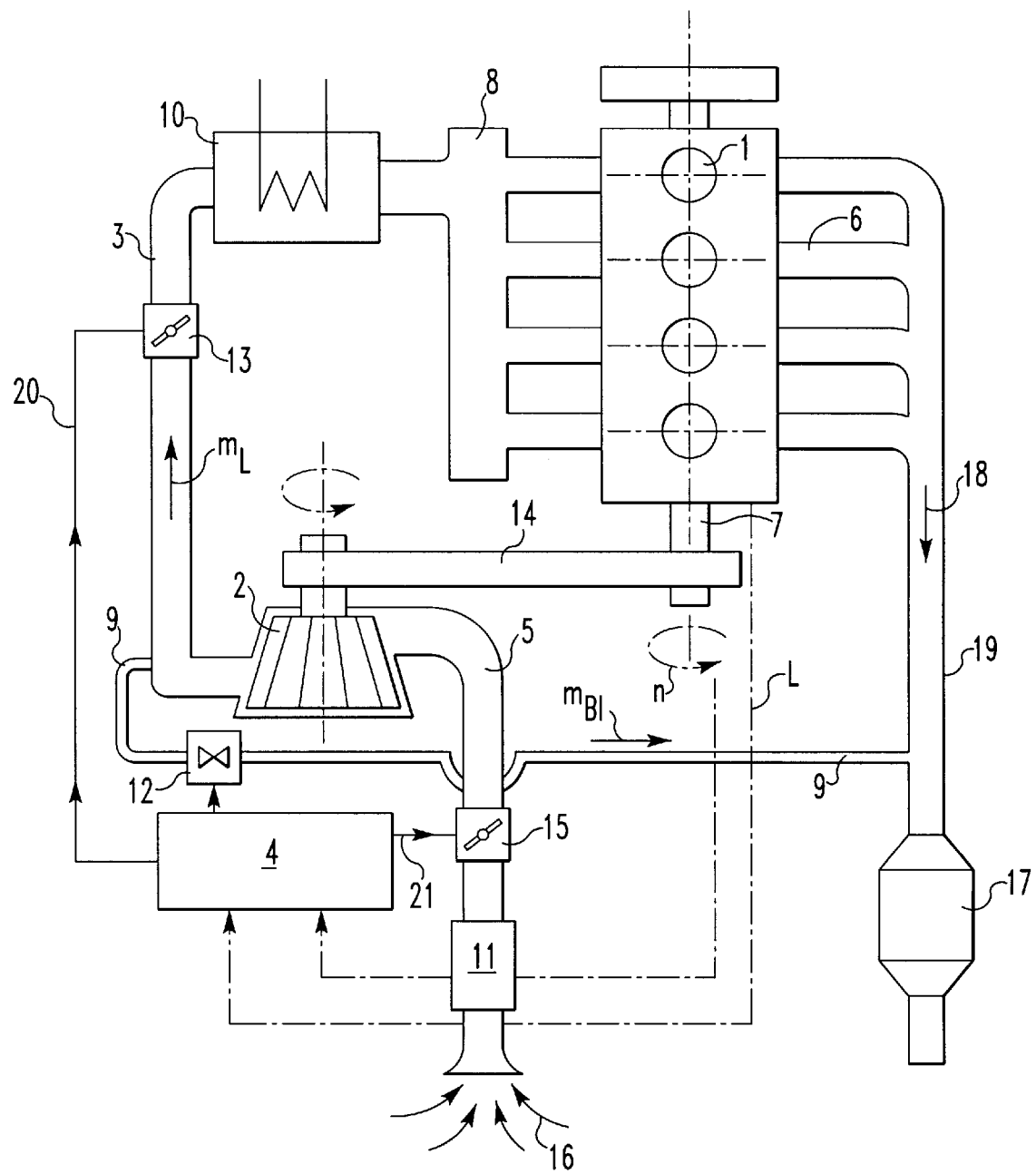

CONTROL OF SUPERCHARGED INTERNAL COMBUSTION ENGINE

BACKGROUND OF THE INVENTION

The invention relates to a supercharged gasoline internal combustion engine including a charger arranged in the engine intake air supply duct, which includes a throttle member upstream of the charger, and a secondary air duct branching off the intake air duct between the charger and the throttle member and leading to an exhaust duct of the internal combustion engine upstream of a catalytic converter. The secondary air duct includes a control valve, which can be controlled, together with the throttle member, by an electronic control unit to which engine operating parameters are supplied for controlling the throttle member and control valve.

The power output of an internal combustion engine is proportional to the airflow through the engine and the air density. Consequently, the engine power output can be increased by compression of the air before it enters the cylinders, that is, by a supercharger. The supercharger is arranged in the intake air duct for compressing the engine intake air. The air mass flow is controlled by the throttle member depending on the instant engine operating point. Before they are discharged to the environment, the exhaust gases of the internal combustion engine are conducted through a catalytic converter, wherein poisonous compounds contained in the exhaust gases are converted.

In order to heat the catalytic converter during the startup phase of the engine rapidly to the operating temperature needed for the conversion, part of the intake air is diverted and admixed to the exhaust gas as it is known from DE 44 41 164 A1. The oxygen added to the exhaust gas with the intake air causes in the catalytic converter an after-combustion, whereby the catalytic converter is heated. In this known arrangement, a secondary air conduct extends from an area of the intake air duct between the supercharger and the throttle to the exhaust duct upstream of the catalytic converter. The secondary air flow conduit is controlled by a flow control valve. The flow control valve and the throttle are connected, by control lines, to an electronic control unit. The control unit receives operating parameters of the internal combustion engine indicative of the engine operating state and the respective air mass flow (for example, the throttling cross-section of the throttle and the position of the control valve) from which it generates the control signals.

In addition to controlling the air mass flow the throttle also enhances the airflow through the secondary air pipe. During operation with secondary air flow when the control valve is open, the throttle may be adjusted beyond the point corresponding to the respective engine load, that is, the throttling cross-section may be reduced to such an extent that the back up pressure ahead of the throttle valve is increased and an increased amount of air is forced through the secondary air duct. Although part of the air is flowing through the secondary air duct, the charge air pressure can be maintained sufficiently high for the respective engine operating conditions by the closing of the throttle valve.

It is the object of this known arrangement to reduce costs and weight. It eliminates the need for air pumps and other components for supplying air to the catalytic converter to cause heating of the catalytic converter during the engine warm-up phase. However, the control arrangement requires an air circulation line by-passing the charger which is connected to the air supply duct downstream of the charger and which leads to the intake side of the charger. The air circulation line includes a control valve, which is controlled by the control unit. The control valve operating mechanism therefore includes an arrangement for a long-term adaptation and the control unit must include a complete performance graph for the angular position of the control valve depending on engine load and engine speed which is deposited in the control unit.

It is the object of the present invention to provide a control arrangement for a supercharged internal combustion engine, which permits air injection into the exhaust gas flow with little constructional expenses and which provides for optimal engine operating conditions.

SUMMARY OF THE INVENTION

In an arrangement and method for controlling a supercharged internal combustion engine having a charger arranged in the air intake duct and a catalytic converter arranged in the exhaust duct, with a secondary air duct including a control valve extending from a point of the intake duct downstream of the charger and upstream of a first throttle member to a point of the exhaust duct upstream of the catalytic converter, a second throttle member is arranged in the intake duct upstream of the charger and the throttle members and control valve are controlled by a control unit in such a way that sufficient air is supplied to the exhaust duct upstream of the catalytic converter such that, during engine warm-up, combustion takes place in the catalytic converter causing rapid heat-up of the catalytic converter.

With the second throttle member arranged in the intake duct upstream of the supercharger, the overall efficiency of the internal combustion engine during partial load operation can be increased by providing a reduced air mass flow. The second throttle member is connected with the control unit—like the throttle member arranged in the intake duct downstream of the charger—so as to receive control signals from the control unit. It is used during which operation for controlling the engine load when the control valve in the secondary air duct is closed. The throttle member arranged in the intake duct downstream of the charger controls the engine load when the control valve in the secondary air duct is open. The control unit decides, depending on the engine operation parameters, whether the air mass flow should be throttled by throttling of the air flow upstream of the charger (by actuating the throttle member upstream of the charger) or whether the throttle member arranged downstream of the charger should be used for controlling the engine air mass flow when the secondary air duct control valve is open that is when secondary air is injected into the exhaust gas flow. During vehicle operation, the charger noise is reduced by the air mass flow control upstream of the charger particularly during operation of the engine under partial load. In addition, a direct charge air pressure build-up and, as a result, improved operating behavior of the internal combustion engine upon activation of the charger, that is during the transition from suction operation to charged air operation of the internal combustion engine, is achieved.

The control arrangement according to the invention requires less constructional expenses than the arrangements that have become known so far since the necessary air ducts of the whole arrangement are short and there is no need for a bypass duct around the charger. The ambient air flap valve used in prior art arrangements also may be eliminated whereby, on one hand, the load control during vehicle operation is improved and, on the other hand, the control chain maintained by the control unit is simplified by inclusion of the ambient air flap valve if such valve is still used. During operation of the engine with secondary air injection the throttle member arranged in the air intake duct downstream of the charger is used for controlling engine load. In this case, the charge air mass flow is throttled downstream of the charger. As a result, the control unit reduces the flow cross-section of the intake air duct to such a degree that the pressure generated upstream of the throttle member provides in the secondary air line the air flow necessary for the injection of air into the exhaust duct. Depending on the engine operating conditions, that is the necessary pressure and flow conditions, the control unit determines the optimum setting of the throttle member for achieving the air injection into the exhaust gas flow.

The control unit synchronizes the control movements of the two throttle members taking into consideration the desired secondary air mass flow such that a changeover from engine operation with secondary air flow to the exhaust duct to operation without secondary air flow to the exhaust duct and the associated change-over to load control by the respective throttle member remains without effect on the operating behavior of the internal combustion engine. The respective deactivated throttie member is fully opened by the control unit. They are controlled in the manner as described only upon a change-over between normal operation and operation with secondary air injection into the exhaust gas.

The invention will be described in greater detail on the basis of the accompanying drawings.

DESCRIPTION OF A PREFERRED EMBODIMENT

The sole FIGURE shows an air flow control arrangement for a supercharged gasoline internal combustion engine.

DESCRIPTION OF A PREFERRED EMBODIMENT

As shown in the FIGURE, a supercharged gasoline internal combustion engine 1 is supplied with pressurized air by an intake air duct 3. The intake air duct 3 leads to a manifold from which air supply ducts lead to the different cylinders of the internal combustion engine 1. At their discharge side, the cylinders are connected to an exhaust manifold 5, which leads to an exhaust duct 19. The exhaust duct 19 includes a catalytic converter 17, through which the exhaust gas flow 18 of the internal combustion engine is conducted before it is discharged to the environment and in which poisonous emissions are removed from the exhaust gases.

The intake air duct 3 of the internal combustion engine 1 includes a charger 2 for pressurizing the intake air. In the embodiment shown, the charger is a mechanical charger, which is driven by the crankshaft 7 of the internal combustion engine 1 by way of a belt drive 14. However, another type of charger such as a turbocharger may be used whose compressor part is disposed in the air intake duct in a well known manner and which is driven by an exhaust gas turbine operated by the exhaust gas flow 18 of the engine. An intake duct 5 leads to the charger 2, the intake air 16 flowing through an air filter 11 before entering the charger 2. The intake air duct 3 includes a charge air cooler 10 which cools the intake air heated during compression in the charger 2, before it is supplied to the manifold 8 and then to the internal combustion engine.

The internal combustion engine is controlled by throttling the air mass flow to the engine. In accordance with the invention, the air intake duct 3 includes two throttle members 13, 15, which can be alternatively activated for controlling the engine load. A downstream throttle member is arranged in the air intake duct 5 downstream of the charger 2 and an upstream throttle member 15 is arranged in the air intake duct 5 upstream of the charger 2. Both throttle members 13, and 15 are connected, by control signal lines 20, 21, to an electronic control unit 4, which generates control signals depending on the engine operating conditions. For the determination for the engine operating state, which serves as the basis for the generation of the control signals, the control unit receives sensor values indicating the engine speed and engine load L. Also, the engine temperature may be utilized for the generation of the control signals.

Between the charger 2 and the downstream throttle member 13, a secondary air duct 9 branches off the intake air duct 3 and leads to the exhaust gas duct 19, to which it is connected upstream of the catalytic converter 17. The secondary air duct 10 includes a control valve 12, which, like the throttle members 13, 15, is connected to the control unit 4 by way of signal transmission lines and which is controlled by the control unit 4. If the control valve 12 is opened, a partial amount of the charge air can flow through the secondary air duct 9 to the exhaust duct 19, where it is admixed to the exhaust gas. By admixing the oxygen-rich, fresh air to the exhaust gas, the oxygen content of the exhaust gas flow 18 is increased so that after-burning is established thereby in the catalytic converter 17 the temperature of the catalytic converter is rapidly increased. During the warm-up phase of the engine the temperature of the catalytic converter 17 can therefore rapidly be increased to operating temperature by opening the control valve 12 thereby causing the after-burning, whereby exhaust poisons are catalytically converted.

For secondary air flow, that is, when the control valve 12 is open, the control unit 4 uses the downstream throttle member 13 for controlling the air mass flow $m_L$ through the internal combustion engine while the throttle member 15 upstream of the charger 2 is kept fully open.

The angular position of the downstream throttle member 13 affects the back pressure in the intake duct 5 ahead of the throttle member 13, that is, downstream of the charger 2, which forces the air compressed by the charger through the secondary air duct 9 for injection into the exhaust duct 19. By varying the angular position of the downstream throttle member 13 and, as a result, the throttle flow cross-section of the intake duct 3, the control unit can control the air mass flow $m_{B1}$ through the secondary air duct 9. If the throttle member 13 is closed beyond the position corresponding to the respective engine operating point, the throttle member position is determined by the control unit 4 in such a way that, on one hand, a sufficient secondary air mass flow $m_{B1}$ is generated, and, on the other hand, the charge air flow $m_L$ as needed for the engine on the basis of operating point dependent load control is provided. The throttle members 13 and 15 are electrically operated. They include throttle operating members to which the control signals are supplied by the control unit 4 for precise setting of the control members.

During operation with the control valve 12 closed, the upstream throttle member 15 is utilized for controlling the engine load that is the air mass flow $m_L$ to the engine is controlled by throttling of the fresh air supply to the charger 2. In this operating mode, wherein the upstream throttle member 15 is used as the active control member for the control of the air mass flow, the downstream throttle member 13 is fully open. The throttling of the fresh air flow ahead of the charger for controlling the air mass flow $m_{B1}$ of the internal combustion engine 1 increases the overall efficiency of the engine particularly during partial load operation and reduces the operating noise of the charger 2.

The control unit 4 synchronizes the control movements of the two throttle members 13 and 15 taking into consideration the desired secondary air mass flow $m_{B1}$ and the required charge air mass flow $m_L$ of the internal combustion engine 1. When the control unit 4 recognizes that the predetermined conditions for the secondary air flow operation are fulfilled, the upstream throttle member 13 is first established as the active throttle member used for the air mass flow control for initiating the introduction of the secondary air flow operation. Then the upstream throttle member 15 is opened. The secondary airflow operation is started with the injection of air into the exhaust duct 19 without affecting the operating behavior of the internal combustion engine 1. During dynamic changes of the operating point of the engine while the engine is operating with secondary air injection into the exhaust duct, for example during engine speed or load changes, the charge air mass flow $m_L$ corresponding to the desired engine load is established by actuation of the downstream throttle member 13.

The upstream throttle member 15 is then adjusted until the desired secondary air mass flow $m_{B1}$ is obtained.

For the termination of the secondary air flow operation the upstream throttle member 15 in the air intake duct 5 is first activated and is brought, with concurrent synchronized control movements of the downstream throttle member 13, to the present desired value for the charge air mass flow $m_L$. After reaching the desired value, the control valve 12 in the secondary air duct 9 is closed and the downstream throttle member 13 is fully opened and deactivated. The optimal throttle member angles for the two throttle members 13, 15 during the switch-over phase of the operating mode and during switch-over of the throttle members from the active to the inactive state and vice versa are determined in advance and are electronically stored in the control unit 4 as performance graphs.

What is claimed is:

1. A method of controlling a supercharged gasoline internal combustion engine having air intake and exhaust ducts with a charger arranged in said air intake duct for compressing the air supplied to said engine and a catalytic converter arranged in said exhaust duct, first and second throttle members disposed in said intake duct downstream and, respectively, upstream of said charger, and a secondary air supply duct connected to the air intake duct between said first throttle member and said charger and to said exhaust duct upstream of said catalytic converter, and including a control valve, said method comprising the steps of: controlling the air mass flow to said engine with said control valve closed by operating said second throttle member so as to throttle the fresh air supply to said charger, while maintaining said first throttle member open and, during secondary air flow operation when said control valve in said secondary air supply duct is open, controlling the air mass flow to said engine by operating said first throttle member so as to throttle the fresh air supply to said engine while maintaining said second throttle member open thereby generating in said air intake duct upstream of said first throttle member an intake air pressure sufficient to cause intake air to flow through said secondary air supply duct to said exhaust duct, wherein, at the beginning of engine operation with air flow through said secondary air duct, said first throttle member disposed downstream of said charger is first activated for controlling the air mass flow to said engine and the second throttle member upstream of said charger is fully opened and, with dynamic changes of the operating parameters of the internal combustion engine during secondary air flow operation, the charge air mass flow corresponding to a desired engine operating point is adjusted by control of the downstream throttle member of the intake duct and the throttle member disposed in the intake duct upstream of the charger is then controlled until the desired secondary air mass flow is obtained, and, for terminating the secondary air flow operation, the upstream throttle member is activated for controlling the engine intake air flow and, at the same time in a synchronized motion, the downstream throttle member is moved to a position corresponding to the present desired value for the intake air mass flow and, subsequently the control valve is closed and the downstream throttle member is fully opened.

2. The method according to claim 1, wherein the secondary air mass flow from said intake duct through said secondary air duct to said exhaust duct is adjusted by controlling said first throttle member downstream of said charger.

3. The method according to claim 1, wherein operation of said throttle members is synchronized taking into account the desired air mass flow through the secondary air duct and the air mass flow needed for the desired engine load.

4. The method according to claim 1, wherein engine operating parameters including engine speed and engine load are supplied to a control unit for determining control signals for operating said control members.

\* \* \* \* \*